A. O. MASON.
RELINER.
APPLICATION FILED MAR. 2, 1920.

1,382,844. Patented June 28, 1921.

Witness
Martin H. Olsen

Inventor
Archibald O. Mason,
By Kummler & Kummler
Attys.

UNITED STATES PATENT OFFICE.

ARCHIBALD O. MASON, OF HIGHLAND PARK, ILLINOIS.

RELINER.

1,382,844. Specification of Letters Patent. Patented June 28, 1921.

Application filed March 2, 1920. Serial No. 362,651.

*To all whom it may concern:*

Be it known that I, ARCHIBALD O. MASON, a citizen of the United States of America, and a resident of Highland Park, county of Lake, and State of Illinois, have invented certain new and useful Improvements in Reliners, of which the following is a specification.

This invention relates to what is generally known as reliners for pneumatic tire casings.

The main objects of the invention are to provide an improved arrangement of a coating of cement and a protecting element therefor, whereby the reliner, after the cement has been rendered adhesive, may be easily inserted into the casing and properly adjusted in place before the cement has had an opportunity to adhere to the casing; and to provide a construction of this kind which is simple and inexpensive to manufacture and which because of the protecting element for the layer of cement, can be inserted by any one whether experienced or not, without the use of tools and without the danger of having portions of the reliner so misplaced as to interfere with the proper functioning of the inner tube when it is replaced and inflated.

An illustrative embodiment of this invention is shown in the accompanying drawings, in which—

For some time in the past it has been a practice, after the tire has been run a mileage near or at that for which it is guaranteed and the fabric has thereby become pretty much strained and perhaps in places injured or weakened, to insert a reliner on the interior thereof, between the casing and inner tube, so as to reinforce the weakened casing and permit its continued use without much likelihood of blowouts. Heretofore, these reliners have comprised a laminated structure of fabric and vulcanized rubber made up in lengths to fit the varying circumferences of the inner faces of the various sizes of casings. These reliners also vary in width, according to the different sizes of tires, being made so as to extend down the sides of the casing to or near the bead.

In constructions previously used, the outer face of these reliners has been coated with a cement which would normally be dry and unadhesive until treated with gasolene or some other solvent, whereupon the cement will become sticky. Due to the fact that the cement becomes sticky immediately upon being treated with the gasolene or other solvent, it has been a very difficult task to put the reliner into the casing and properly adjust it before parts would become stuck to the casing, with the result that creases and wrinkles are frequently formed in the reliner which have an injurious effect upon the inner tube when it is replaced in the casing and inflated.

This improved reliner comprises a strip of composition material 1 made up in any suitable manner by laminating fabric and vulcanized rubber. When completed this strip of material is unbroken in the sense that it has no transverse cuts or slits therein so that the threads or strands are continuous from end to end of the strip. A layer of cement 2 is placed upon the outer surface and the cement is then covered with a layer of thin and rather coarse woven fabric 3. The cement is of the general type used, which after being applied becomes dry and practically unadhesive, but which upon treatment with gasolene or some other solvent becomes extremely sticky. By reason of the use of the protecting fabric 3 it is possible and usually preferable to apply considerably more cement than is used on the reliners heretofore provided.

The protecting covering before being placed upon the reliner is first impregnated with a thin solution of the rubber cement, practically the same as that used upon the face of the reliner. This insures all of the cement 2 being available to secure the reliner to the casing without having a considerable portion thereof absorbed by the fabric protection 3, which might be the case if it were not first impregnated.

Figure 1:
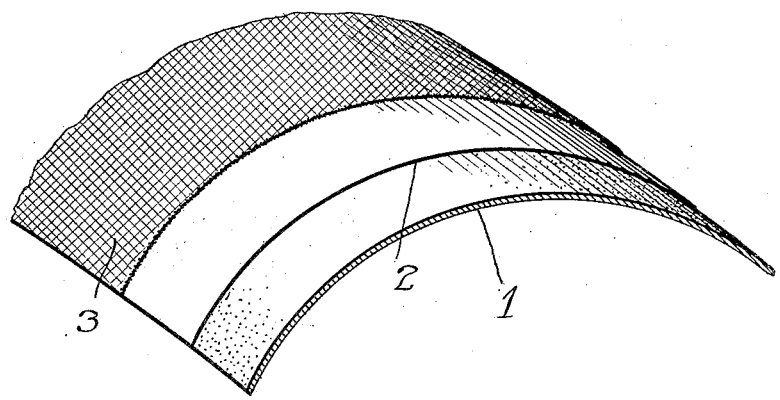
Figure 1 is a perspective view of a section of the improved reliner.
Figure 2:
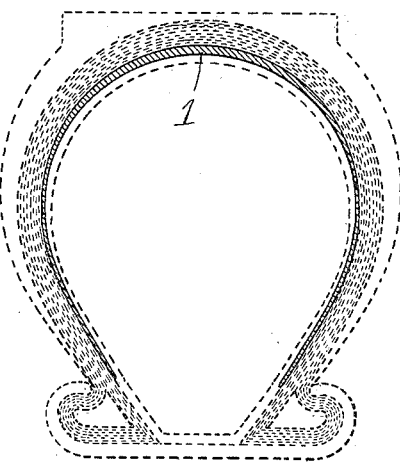
Fig. 2 shows in dotted outline a transverse sectional view of a pneumatic tire with the reliner shown in place by full outline.

When a reliner of this improved type is to be inserted, the casing is first washed out with gasolene so as to remove all of the soapstone previously placed therein. The protecting fabric 3 and layer of cement 2 are then thoroughly moistened with gasolene or some other solvent, whereupon the reliner is placed in the casing substantially in the position shown in Fig. 2. This is readily accomplished without difficulty because, although the cement has been rendered sticky, it does not penetrate the meshes of the protecting fabric 3 until pressure has been applied. After the reliner has been properly adjusted in the casing, the inner tube is inserted, the casing replaced on the rim of the wheel and the inner tube inflated.

As the tube gradually fills out the reliner, if for any reason it has not been properly adjusted in place by hand, is urged by the pressure of the tube into such proper position. This is accomplished because no cement has up to that time been forced out through the protecting fabric and consequently the reliner has not become fixed in its position in the casing. The pressure of the inner tube upon the reliner causes the cement to ooze out through the meshes of the protecting fabric 3 and firmly cement the reliner in place.

Although but one specific embodiment of this invention has been herein shown and described, it will be understood that some of the details of the construction shown may be altered or omitted without departing from the spirit of this invention as defined by the following claims.

I claim:

1. A reliner for pneumatic tire casings, comprising an unbroken strip of material formed separate from the casing adapted to fit within the casing and being of a length which will extend around the entire inner circumference of said casing, a coating of cement on the outer face of said length of material, and a protecting covering arranged over said cement.

2. A reliner for pneumatic tire casings, comprising a length of material made up of laminated fabric and vulcanized rubber, said reliner being of arcuate-shaped form in transverse cross-section and adapted to fit the casing, a layer of cement on the outer face of said length of material, and a thin and rather coarse woven fabric protecting covering arranged over said cement for the purpose described.

Signed at Chicago this 26th day of February 1920.

ARCHIBALD O. MASON.